Patented July 7, 1953

2,644,805

UNITED STATES PATENT OFFICE 2,644,805

BORIC ACID-METHYL POLYSILOXANE COMPOSITION

Robert W. Martin, Lenox, Mass., assignor to General Electric Company, a corporation of New York No Drawing. Application May 15, 1951, Serial No. 226,540

1 Claim. (Cl. 260—46.5)

This invention is concerned with novel polysiloxane compositions and particularly relates to a composition of matter having unique properties obtained by effecting reaction between boric acid and tetramethyl disiloxane diol-1,3.

The compositions herein described have unique properties depending on the temperatures to which they are subjected. I have found that when one effects reaction between boric acid and tetramethyl disiloxane diol-1,3, there is obtained a composition which at or around normal temperatures of the order of about 25 to 35° C. resembles a thin starch paste in appearance. However, if the mixture is stirred and warmed to about 50-55° C. or higher, the mixture congeals rapidly forming a mass resembling bouncing putty described in Wright Patent 2,541,851, issued February 13, 1951, and assigned to the same assignee as the present invention. The material resembles the bouncing putty described in the aforesaid patent in that it can be deformed by the slow application of pressure. However, if dropped on a hard surface it bounces as a rubber ball. In the temperature range of approximately 55° C. it possesses the properties commonly associated with bouncing putty. However, on cooling, the composition loses its putty-like properties and is converted to a starch-like solution or thin paste again which is entirely contrary to the results obtained when similar temperature changes are applied to the bouncing putty described in the aforesaid Wright patent. If the composition is again heated, its physical form changes back to something resembling again the bouncing putty. This process of heating to cause congealing and cooling to melt the composition can be repeated a number of times.

The tetramethyl disiloxane diol-1,3 may be prepared in accordance with the method described and claimed in Lucas et al. application, Serial No. 149,886 filed March 15, 1950, now U. S. Patent 2,600,307, issued June 10, 1952, and assigned to the assignee of the present invention.

The proportion of tetramethyl disiloxane diol-1,3 (hereinafter referred to as "diol") to boric acid may be varied within limits to obtain the desired composition. Generally, on a weight basis, for each part of boric acid used I may employ from 2.5 to 3.5 parts of the diol. Generally, I have found that best results are obtained when from 2.8 to 3.0 parts of tetramethyl disiloxane diol-1,3 is mixed with 1 part of boric acid and the mixture warmed slightly or ground together to obtain a thin starchy paste.

In order that those skilled in the art may better understand how the present invention may be practiced, the following example is given by way of illustration and not by way of limitation. All parts are by weight.

Example

A mixture of 8.3 parts tetramethyl disiloxane diol-1,3 and 2.96 parts boric acid was placed in an open vessel and the mixture heated slightly. As soon as a few of the tetramethyl disiloxane diol-1,3 crystals had melted, the entire mass became a thin solution with what appeared to be some undissolved boric acid suspended in the solution. It was surprising to find that such a mixture was fluid at room temperature when the tetramethyl disiloxane diol melts at 67–68° C. and boric acid melts at 185° C. with decomposition.

The mixture was warmed to about 50° C. on a steam bath and stirred. Almost immediately the mass formed a stiff putty-like composition. This putty-like material bounced when dropped onto a hard surface, yet could be readily deformed by the application of slow pressure. On allowing the mass to cool, it melted when the temperature reached about 35° C. to give a thin starch-like paste or solution. On reheating the starch-like mass to about 55° C., gelation or congealing again occurred. On working the putty-like material and cooling to 37° C., the gel or putty became stringy and again softened and the starch-like solution again formed. This process of heating to cause gelation or formation of the putty and cooling to form a starch-like paste was repeated several times. After about six times, the last time the gel was formed, cooling failed to give the starch-like solution. Instead, a somewhat crumbly mass remained. After heating 16 hours at 50° C., a crumbly, dry material resulted. This was ground in a mortar with 1.5 ml. water. Again a starch-like paste formed which on heating to 55° C. congealed as before. On stirring and cooling to room temperature, a starch-like paste was again formed. This showed that the loss of reversibility of the system after repeated heating and cooling operations was, in part, due to the loss of water. When sealed in a glass tube, the composition maintained its reversibility without change through more than 12 cycles of heating and cooling.

The composition described above will tolerate certain materials in addition to the boric acid and tetramethyl disoloxane diol-1,3. Thus, the addition of small amounts of water results in a thinner starch-like paste on cooling to 45° C. after the mixture has been warmed to 65° C. to give a congealed rather stiff putty. The addition of 1 part diethylene glycol to the composition described in Example 1 and thereafter subjecting the mixture to warming to around 55–60° C., gave again to a bouncing putty. On cooling to 40° C., an opalescent solution was formed. Other materials which can be added include various pigments such as titanium dioxide, lithopone, etc.; glycerine, which when added to the composition of matter described in the Example gives an irreversible gel when the mixture is heated.

The composition of matter described herein may find use as a control device wherein the change in the physical state of the composition caused by changes in temperature may be able to actuate electrical contacts, and thus control opening and closing of the contacts.

What I claim as new and desired to secure by Letters Patent of the United States is:

The method which comprises (1) forming a mixture of ingredients comprising, by weight, 1 part boric acid and from 2.5 to 3.5 parts tetramethyl disiloxane diol-1,3, and (2) warming the mixture of ingredients slightly to produce a composition which at normal temperatures of about 25° to 35° resembles a thin paste but at temperatures of from 50° to 55° C. congeals to a putty-like composition.

ROBERT W. MARTIN.

References Cited in the file of this patent

UNITED STATES PATENTS

| Number | Name | Date |
| --- | --- | --- |
| 2,258,218 | Rochow | Oct. 7, 1941 |
| 2,431,878 | McGregor | Dec. 2, 1947 |
| 2,600,307 | Lucas | June 10, 1952 |